(12) United States Patent
Menoret et al.

(10) Patent No.: US 11,077,591 B2
(45) Date of Patent: Aug. 3, 2021

(54) LENS FOR A LIGHTING AND/OR SIGNALING DEVICE OF A MOTOR VEHICLE

(71) Applicant: VALEO VISION, Bobigny (FR)

(72) Inventors: Romain Menoret, Angers (FR); Guillaume Altermatt, Angers (FR); Jean-Marc Colombel, Angers (FR)

(73) Assignee: VALEO VISION, Bobigny (FR)

( * ) Notice: Subject to any disclaimer, the term of this patent is extended or adjusted under 35 U.S.C. 154(b) by 752 days.

(21) Appl. No.: 15/563,079

(22) PCT Filed: Mar. 24, 2016

(86) PCT No.: PCT/EP2016/056676
§ 371 (c)(1),
(2) Date: Feb. 9, 2018

(87) PCT Pub. No.: WO2016/156253
PCT Pub. Date: Oct. 6, 2016

(65) Prior Publication Data
US 2018/0169916 A1    Jun. 21, 2018

(30) Foreign Application Priority Data
Apr. 1, 2015    (FR) ...................... 15 52793

(51) Int. Cl.
*B29C 45/16*    (2006.01)
*F21S 41/20*    (2018.01)
(Continued)

(52) U.S. Cl.
CPC .............. *B29C 45/16* (2013.01); *B29C 33/74* (2013.01); *F21S 41/28* (2018.01); *F21S 43/26* (2018.01);
(Continued)

(58) Field of Classification Search
CPC .......... B29C 45/16; B29C 33/74; F21S 41/28; F21S 43/26
(Continued)

(56) References Cited

U.S. PATENT DOCUMENTS 2,343,598 A * 3/1944 Wagner .................. F21S 43/27
362/541
5,721,039 A * 2/1998 Yanagihara ........... B29C 45/062
359/642
(Continued)

FOREIGN PATENT DOCUMENTS

DE       298 09 618 U1    7/1998
DE   10 2012 015 265 A1    2/2014
(Continued)

OTHER PUBLICATIONS

International Search Report dated Jun. 14, 2016, in PCT/EP2016/056676 filed Mar. 24, 2016.
(Continued)

*Primary Examiner* — Bryon T Gyllstrom
(74) *Attorney, Agent, or Firm* — Oblon, McClelland, Maier & Neustadt, L.L.P.

(57) ABSTRACT

The object of the invention is a lens for a lighting and/or signaling device of a motor vehicle including a first layer of material (4), arranged on a first face (8) of which is a second layer of material (6) with additional thickness, said second layer extending partially over the first layer so as to have one end edge (16) overhanging an exposed portion (14) of the first layer of material.
The exposed portion (14) of the first layer of material (4), which is not covered by the second layer of material, includes on said first face (8) a notch (18) which extends along said end edge (16) of the second layer of material (6).

11 Claims, 1 Drawing Sheet

(51) Int. Cl.
  *F21S 43/20* (2018.01)
  *B29C 33/74* (2006.01)
  *B29C 45/14* (2006.01)
  *F21V 3/10* (2018.01)
  *B29L 31/30* (2006.01)

(52) U.S. Cl.
  CPC ............. *B29C 45/14336* (2013.01); *B29K 2995/0025* (2013.01); *B29K 2995/0026* (2013.01); *B29L 2031/30* (2013.01); *F21V 3/10* (2018.02)

(58) Field of Classification Search
  USPC ........................................................ 362/317
  See application file for complete search history.

(56) References Cited

U.S. PATENT DOCUMENTS

| | | | | |
|---|---|---|---|---|
| 7,722,196 | B2* | 5/2010 | Caire | B29C 45/0025 359/529 |
| 8,268,205 | B2* | 9/2012 | Choi | B29C 45/0053 264/1.31 |
| 10,099,413 | B2* | 10/2018 | Ito | B29C 45/16 |
| 10,648,638 | B2* | 5/2020 | Zhu | F21S 41/285 |
| 2004/0227270 | A1* | 11/2004 | Takebe | B29C 45/1675 264/255 |
| 2004/0227271 | A1* | 11/2004 | Takebe | B29C 45/0025 264/255 |
| 2005/0003159 | A1* | 1/2005 | Ikeda | B29C 45/16 428/156 |
| 2015/0306801 | A1* | 10/2015 | Ito | B32B 27/08 428/99 |

FOREIGN PATENT DOCUMENTS

| | | |
|---|---|---|
| FR | 2 272 332 A1 | 12/1975 |
| FR | 2 853 952 A1 | 10/2004 |

OTHER PUBLICATIONS

French Search report dated Feb. 19, 2016 in FR 1552793 filed Apr. 1, 2015.

* cited by examiner

LENS FOR A LIGHTING AND/OR SIGNALING DEVICE OF A MOTOR VEHICLE

The invention relates to the field of lighting and/or signaling, in particular for motor vehicles. More specifically, the invention relates to the design and production of a lens acting as a closure for a housing of a lighting and/or signaling device of a motor vehicle.

These lenses are essentially transparent, in order to permit the passage of the light rays emitted by the optical elements accommodated in the housing towards the exterior of the vehicle. Conventionally, the transparent element is partially covered, in particular on its periphery or at the very least on an edge, by an opaque element, which in particular permits the assurance of an aesthetic continuity between the transparent element of the lens and the element of the vehicle body in which the lighting device is accommodated. The element which is transparent to light and the opaque element are each formed by a layer of plastic material obtained by a molding operation. Methods are already familiar, in which the opaque element is molded in a first step and the transparent element is molded in a second step by overmolding of the opaque element. The mold and the counter mold utilized for the first molding operation are reutilized, separated one from the other, to define the cavity into which the material for the transparent element is injected. This method of operating, although it permits the production of lenses at a fast rate and at low cost, gives rise to two types of disadvantages. The wear on the portions of mold made of steel when they are pressed one against the other for the effective sealing of the mold during the injection of material in the first molding operation generates a random roughness for surfaces that are adapted to define the material injection zone in the second overmolding operation, so that a transparent zone of the element, in proximity to the opaque element, may have a surface state requiring refinishing by polishing to a greater extent than expected. This refinishing is all the more inconvenient in that the localization of this surface to be reworked is not constant from one component to the other. In particular, the wear on the molds evolves as the cycles progress. Similarly, during the overmolding operation and the arrival of plastic material at high temperature, deformation of the opaque element in place in the mold can be observed, and in particular by the drawing of material from the contact abutment supported on the end edge of the opaque element overhanging the transparent element.

The present invention proposes a lens addressing these disadvantages, which is obtained by a method that is particularly simple to implement, which does not require time-consuming reworking operations, and which is in line with the general aesthetic approach of the headlamp.

The object of the invention is thus a lens for a lighting and/or signaling device of a motor vehicle including a first layer of material, arranged on a first face of which is a second layer of material with additional thickness, said second layer extending partially over the first layer so as to have one edge overhanging an exposed portion of the first layer of material, which is not covered by the second layer of material. According to the invention, the exposed portion of the first layer of material includes on said first face a notch which extends along said edge of the second layer of material.

According to different characterizing features of the invention, taken alone or in combination, provision may be made so that:

the first layer is produced from a plastic material which is transparent to light, whereas the second layer is produced from a plastic material that is more opaque than said first layer;

the second layer extends to the periphery of the first layer; in particular, the second layer may extend to the periphery of the first layer, on all or a portion of the contour of the latter.

the notch may have an inclined surface and, for example, an inclined plane, starting substantially from the contact edge of the first layer with the edge of the second layer enabling it to be embedded in the thickness of the first layer; and said notch has an abutment wall which extends preferably substantially perpendicularly to the first face of the first layer, extending the inclined surface where appropriate; said abutment wall may extend approximately to 2.5 mm from the contact edge of the first layer with the edge of the second layer, and the depth of the notch may be approximately 0.2 mm;

the contact edge of the first layer with the edge of the second layer extends substantially in the same plane as the exposed portion of the first layer;

the two layers of material consist of molded plastic layers, the first layer of plastic being overmolded on the second layer of plastic material;

The invention also relates to a lighting and/or signaling device including a housing adapted to accommodate optical equipment and closed by a lens, as outlined above.

In a suchlike device, provision may be made advantageously so that:

the lens is oriented so that the first face of the first layer bearing the notch is turned towards the interior of the housing;

the lens is fixed to the housing at the level of the second layer of material.

The invention finally relates to a method for producing a lens of a headlamp of a motor vehicle, including two layers of plastic material, of which a second layer extends with additional thickness over a portion of the first layer, and in which provision is made for the successive production of at least the following stages:

a stage of molding of the second layer of material in a mold made of steel, against which a mobile counter mold, also made of steel, is pressed, and which has a projecting shape with an inclined ramp and a step, the mold and the counter mold being supported for a distance equivalent to the width of said ramp, said inclined ramp starting from the edge of the counter mold in contact with the mold and adapted to delimit the forming of the second layer of material;

a stage of releasing from the mold for a distance equal to the desired thickness of the first layer;

a stage of molding of the first layer in the mold so that it is produced by overmolding on the second layer of material and by molding around the counter mold and its projecting shape.

In the method according to the invention, provision may be made for the direction of injection of the material utilized for the first layer to be such that this material initially comes into contact with the step of the counter mold, in order to be overmolded on the second layer that is present in the mold after passage of said ramp.

Other characterizing features and advantages of the present invention will be appreciated more clearly with the help of the description and the drawings, among which:

First of all, a description will be given of the lens 2 according to the invention, illustrated in FIGS. 1 to 3. This lens overlaps a housing of a lighting and/or signaling device in which optical equipment is accommodated, at least a light source, the housing and the optical equipment of which not being visible here.

Figure 1:
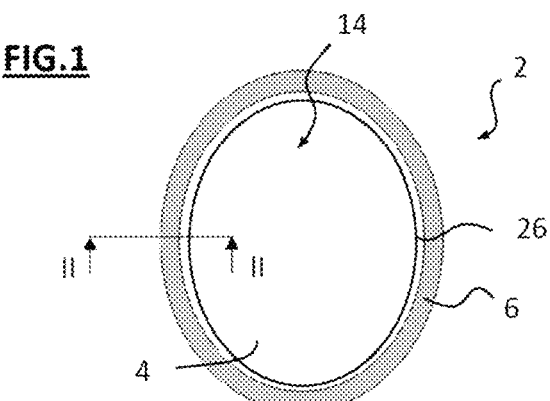
FIG. 1 is a front view of a lighting and/or signaling device, in which only the lens arranged in front of a housing of the device is visible, said lens having a central portion which is transparent to light and a peripheral opaque portion.

In FIG. 1, the front view of the lens 2 illustrates the presence of a first layer 4 of a transparent material and a second layer 6 of an opaque material. It should be appreciated that the expression opaque material is used to denote that the second layer of material emerges as being less transparent to light than the first layer of material. The lens here has a circular or substantially ellipsoidal shape. It should be appreciated that the contours of the lens may be different, in order to adapt to the shape of the signaling device and to the optical elements accommodated in the housing closed by the lens, and to the shape of the element of vehicle body in which the device is mounted.

The second layer 6 is arranged on the periphery of the first layer 4, for a width determined both by aesthetic constraints—it is necessary to ensure that the visual effect of continuity between the vehicle body and the transparent central portion of the light is good, and by lighting regulation constraints—it is necessary to ensure that the portion which is transparent to light is sufficiently large to achieve the necessary lighting functions.

Figure 3:
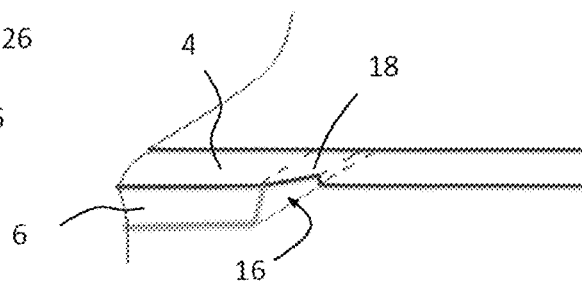
FIG. 3 is a perspective view of the cross-section of the lens illustrated in FIG. 2.
Figure 2:
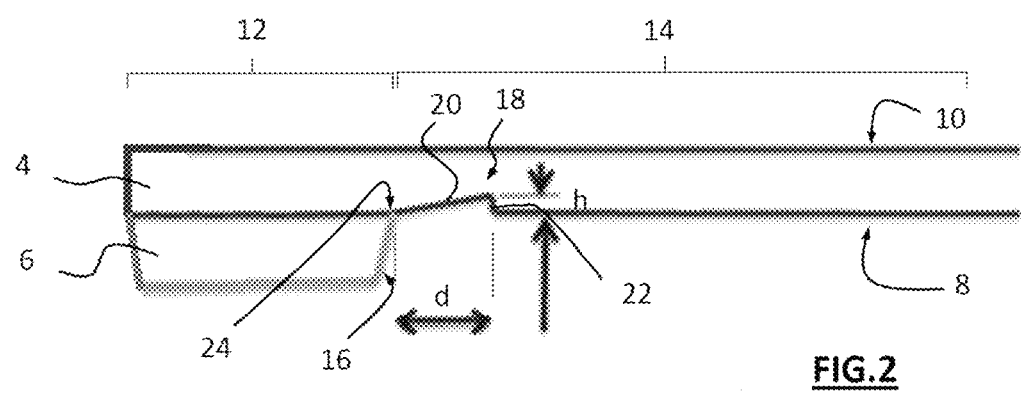
FIG. 2 is a sectional view of the lens in the axis II-II illustrated in FIG. 1.

In FIGS. 2 and 3, it can be seen that the second layer 6 is arranged as an additional thickness of the first layer 4. The first layer takes the form of a sheet of transparent plastic material, of the PMMA type, and this sheet has a first face 8 and a second face 10 one opposite the other. The first face 8 is turned towards the interior of the vehicle, and the second face 10 is turned towards the exterior of the housing.

The first face 8 of the first layer 4 supports the second layer 6, arranged towards the interior of the vehicle in relation to the first layer. A portion 12 covered by the second layer and an exposed portion 14, which is not covered by the second layer and through which the light rays emitted by the signaling and/or lighting device are able to exit, can be identified on the first layer 4.

The second layer 6 thus projects from the first layer 4 and it has an end edge 16 overhanging the first layer, said end edge 16 being substantially perpendicular to the first face 8 of the first layer 4.

It will be appreciated that, in the illustrated embodiment, the exposed portion 14 in this case is a central portion, surrounded by the covered portion 12, but that in other embodiments, these two portions of the first layer could be the two halves of a substantially rectangular assembly, for example.

The first face 8 of the first layer 4 extends on one and the same plane, both for the covered portion and for the exposed portion, with the exception of a notch 18 formed in the thickness of the first layer from the first face.

The notch 18 is produced for the entire length of the second layer 6, in the direct vicinity of the end edge 16 thereof. The notch is formed in the thickness of the first layer by an inclined surface 20 and an abutment wall 22, the inclined surface 20 being adapted to be embedded in the thickness of the first layer, and the abutment wall 22 forming a return towards the first face of the first layer.

The inclined surface 20 has a proximal extremity substantially in the vicinity of the contact abutment 24 of the first layer 4 with the end edge 16 of the second layer 6, and the abutment wall 22 prolongs the distal extremity of the inclined surface 20 so as to extend substantially perpendicularly to the first face 8 of the first layer 4.

For a given cross section, such as that illustrated in FIG. 2, the second layer 8 projects from the first layer 4 so as to extend beyond the latter in a first direction D1, the end edge 16 of the second layer 8 extending substantially in this first direction. And the notch 18 is cut into the thickness of the first layer 4 substantially in this first direction D1, in the opposite direction. For this same given section, the notch 18 extends away from the end edge 16 of the second layer 8, in a second direction D2.

From the exterior, as can be seen in FIG. 1, an observer sees an exposed central portion 14, which is transparent to light, a darker peripheral portion 12, as well as a band 26 which extends along the peripheral portion, at a constant distance, the band 26 being annular in this case. The observer thus has the impression of a tested design, with a band extending in a continuous manner at a constant distance from the darkest portion. The observer, situated facing towards the device, sees only a band as a result of the orientation of the abutment wall 22, substantially perpendicular to the first face 8 of the first layer 4, and therefore substantially parallel to the optical axis.

The dimensions of the notch 18 are small in relation to the dimensions of the two layers forming the lens 2. It should be appreciated that the width of the notch, as indicated by the presence in FIG. 1 of the band 26, has been exaggerated in order to improve the readability of the figure. By way of example, provision can be made for the width of the notch 18, that is to say substantially the distance of the abutment wall 22 in relation to end edge 16 of the second layer 6, to be between 2 mm and 3 mm, and in particular for it to be substantially equal to 2.5 mm. The inclination of the slope and the width, as previously defined, advantageously ensure a depth of the notch, that is to say substantially the height of the abutment wall in relation to the first face, of between 0.1 mm and 0.3 mm, and in particular substantially equal to 0.2 mm.

Figure 4:
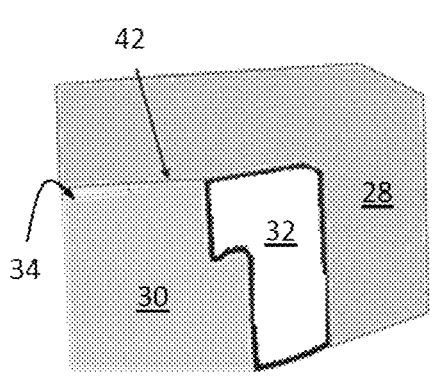
FIGS. 4 and 5 are views representing different stages of the method for obtaining the lens according to the invention by molding, FIG. 4 illustrating a stage of molding of the peripheral portion of the lens, and FIG. 5 illustrating a subsequent stage of overmolding of the transparent portion on the peripheral portion.
Figure 5:
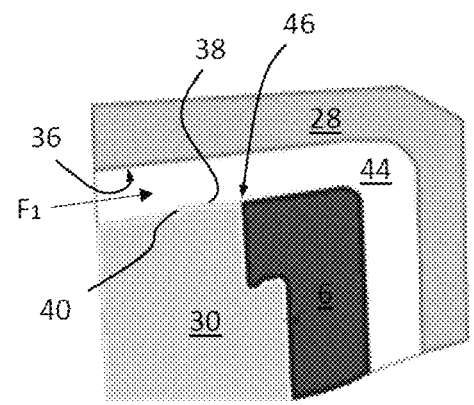

We will now proceed to describe the method for producing the lens, and hence to describe the advantages, other than those already defined as having an aesthetic effect, of producing the notch on the first face, in particular with the support of FIGS. 4 and 5.

The two layers of material 4, 6 consist of molded layers of plastic material, the first layer of plastic 4, which is transparent to light for the purpose of implementing the lighting function, being overmolded on the second layer of plastic material 6, which is darker for the purpose of implementing the aesthetic function.

A first operation of molding the opaque portion of the device formed by the second layer of plastic material 6 is carried out for this purpose. As illustrated in FIG. 4, a first portion of the mold 28 forms a fixed base, into which a movable drawer is introduced, forming a counter mold 30, similarly made of steel. The plastic material is injected into the cavity 32 formed between the mold and the counter mold. As can be seen in the figure, the counter mold 30 is supported, at the level of one of its external faces 34, against at least one internal face 36 of the mold 28, and it has a shape specific to the invention, forming as a projection from this external face a ramp 38 starting from the edge of the counter mold and intended to delimit the injection cavity of the plastic material and extending as far as a flange forming a step 40. The mold 28 and the counter mold 30 are supported in this zone only for a distance equivalent to the width of said ramp 34. When the pressure necessary for the proper functioning of the method of molding is applied to the mold and the counter mold, the steel of the mold 28 rubs against the steel of the counter mold 30 and, according to the invention, this erosion is concentrated on these two surfaces in a restricted zone 42 situated at the level of the ramp 34 formed on the counter mold.

As illustrated in FIG. 5, these same elements, being the mold 28 and the counter mold 30, serve in the following stage for the overmolding of the first transparent layer 4 on the second opaque layer 6. As a consequence, only the restricted erosion zone 42 is able to generate an unsatisfactory surface state requiring reworking by polishing. This erosion zone is situated at the level of the ramp 38, so that the surface state to be reworked is concentrated, on the first face 8 and/or the second face 10 of the first layer 4, at right angles to the shape corresponding to the ramp formed on the first face of the first layer, namely the inclined surface of the notch 18. The abutment wall 22 in this case acts as a guide for the means of polishing on the first face, which remains active solely in the zone of the notch.

The mold 28 and the counter mold 30 are displaced, separated one from the other, for a distance equal to the desired thickness of the first layer 4 that it is wished to inject. A second cavity 44 adapted to receive the plastic material for the production of the first plastic layer 4 is defined in this way. As illustrated in FIG. 5 by the arrow $F_1$, the direction of injection of the material utilized to produce the first layer is such that said material is in contact with the counter mold 30 before arriving above the second layer 6. In this way, the flow of material encounters a taper of the cross section, at the level of the step 40 of the counter mold, which limits the speed of impact of the material on the sharp edge 46 of the opaque portion that is already present in the mold. The decompression generated thereby makes it possible to avoid any drawing of material with the ability to create a bead that is perceivable by the observer.

The preceding description explains clearly how the invention makes it possible to achieve the objectives that it has set itself to achieve, and in particular to propose a lighting and/or signaling device that is capable of being realized by the successive molding and overmolding of two layers of plastic material, of which the one has an additional thickness to the other only on a portion which has an aesthetic appeal for the outside observer and is reproducible for each vehicle bearing said device. In this context, the provision of a notch on a face of the layer of material supporting of the other layer makes it possible to ensure a mark at a constant distance from one vehicle to the other, while concentrating the zones of degradation at the level of this notch, which facilitates the operations of reworking the devices before their installation on the vehicle, while similarly making it possible to control the injection of material in the molding operation in order to limit any deformations of the material in the mold.

Of course, various modifications may be made by a person skilled in the art to the structures of the device, which are described here by way of non-exhaustive examples, if the lighting and/or signaling device has a notch performing the roles mentioned in the present description. By way of example, the shape and the respective disposition of the layers of material could be modified, if the notch continues to face towards the layer of material with additional thickness. The layers of material could also be overmolded one in relation to the other, without departing from the context of the invention, with one bearing the notch, but without one of these layers being clear and the other opaque.

The invention claimed is:

1. A lens for a lighting and/or signaling device of a motor vehicle including a first layer of material, arranged on a first face of which is a second layer of material with additional thickness, said second layer extending partially over the first layer so as to have one end edge overhanging an exposed portion of the first layer of material,
   the exposed portion of the first layer of material, which is not covered by the second layer of material a notch which extends along said end edge of the second layer of material, wherein
   the notch has an inclined surface as an inclined plane, starting substantially from a contact edge of the first layer of material with the end edge of the second layer of material, enabling it to be embedded in the thickness of the first layer of material.

2. The lens as claimed in claim 1, wherein the first layer of material is produced from a plastic material which is transparent to light, and in that the second layer of material is produced from a plastic material that is more opaque than said first layer of material.

3. The lens as claimed in claim 1, wherein the second layer of material extends to the periphery of the first layer of material.

4. The lens as claimed in claim 1, wherein the notch has an abutment wall, preferably substantially perpendicular to the first face of the first layer of material.

5. The lens as claimed in claim 1, wherein said abutment wall extends approximately to a distance of between 2 and 3 mm from the contact edge of the first layer of material with the end edge of the second layer and in particular to a distance of 2.5 mm.

6. The lens as claimed in claim 1, wherein the depth of the notch is between 0.1 mm and 0.3 mm, and in particular is equal to 0.2 mm.

7. The lens as claimed in claim 1, wherein the two layers of material consist of molded plastic layers, the first layer of plastic material being overmolded on the second layer of plastic material.

8. A lighting and/or signaling device including a housing adapted to accommodate optical equipment and closed by a lens, as claimed in claim 1.

9. The device as claimed in claim 8, wherein the lens is oriented so that the first face of the first layer of material bearing the notch is turned towards the interior of the housing.

10. The device as claimed in claim 9, wherein the lens is fixed to the housing at the level of the second layer of material.

11. The device as claimed in claim 1, wherein said inclined plane has a continuous incline starting substantially from the contact edge and extending away from the contact edge.

* * * * *